United States Patent Office 2,862,035
Patented Nov. 25, 1958

2,862,035

PROCESS FOR THE FISSION OF ETHERS

Karl-Walter Müller, Leverkusen-Bayerwerk, and Detlef Delfs, Opladen, Germany, assignors to Farbenfabriken Bayer Aktiengesellschaft, Leverkusen, Germany, a corporation of Germany No Drawing. Application January 26, 1956
Serial No. 561,649

Claims priority, application Germany January 28, 1955

5 Claims. (Cl. 260—620)

This invention relates to a process for the fission of ethers.

It is known that ether can be split with sodium into compounds containing hydroxyl groups (German Patent 492,064, Annalen der Chemie, 434, page 53, Berichte der deutschen chemischen Gesellschaft 56, page 176; cf. also Journal of the Chemical Society 76, 2973, and Annalen der Chemie, 542,241). However, the yields of definite compounds containing hydroxyl groups which are thereby obtained are not good. Ether can also be split, by the action of alkali metal hydrides but no compounds containing hydroxyl groups are obtained when using this method (Berichte der deutschen chemischen Gesellschaft 61, 2600).

It has now been found that ethers can be split to yield compounds containing hydroxyl groups and hydrocarbons, if the ether is treated with an alkali metal and with molecular hydrogen, preferably in a solvent.

Ethers which can be subjected to the process according to the invention are aromatic, aliphatic, aralphatic or mixed aromatic-aliphatic ethers of cyclic or open configuration which contain only one ether configuration on one carbon atom and wherein the ring of the cyclic ethers are at least 5-membered, such as diphenylene oxide, diphenyl ether, phenetole, anisole and furane.

Corresponding amounts of alkali metal are fixed by the alcohol or the phenol being formed in the reaction, and it is therefore preferred to use at least one mol of alkali metal per mol of ether. Other proportions can, however, be chosen if this is desired.

Hydrocarbons, such as for example ligroin or decahydronaphthylene or even the ethers themselves when used in excess, can be employed as solvents.

Generally speaking, temperatures in the range from 100–300° C., but preferably those in the range from 150–200° C. are used in the process according to the invention; in some cases, however, it may be advantageous to use another temperature.

It is not necessary to employ high hydrogen pressures. In most cases, it suffices to force in the calculated amount of hydrogen or less, and then to force in further hydrogen as it is required. The fission temperatures can be further lowered and the yields improved by adding hydrogenation catalysts, such as Raney-nickel. Furthermore, it has been shown that the fission of the ethers is facilitated by adding compounds which can readily form organo-metallic compounds with alkali metals and can yield the alkali metals again. Compounds of this type are, for example, fluorene, anthracene and cyclopentadiene.

The novel process can, for example, be carried into effect in a stirrer-type autoclave by dissolving the ether in inert solvent, such as ligroin, adding a suitable amount of alkali metal and forcing in the necessary amount of hydrogen under pressure. The stirrer mechanism is then operated for a time at relatively high temperature, preferably in the region of 150 to 200° C. After the reaction has taken place, the solvent can be distilled off and unreacted alkali metal decomposed, for example with alcohol. The alcohols or phenols formed by the process according to the invention can then be recovered in the usual manner from the reaction mixture.

The compounds obtainable by the present process are capable of being widely used as intermediate products, for example, for the manufacture of dyestuffs or insecticides.

The following examples illustrate the present invention without, however, limiting it thereto:

Example 1

168 g. of diphenylene oxide, 230 cc. of ligroin and 46 g. of sodium metal are introduced into a $V_2A$ stirrer-type autoclave and, after forcing in hydrogen to a pressure of 40 atm., heated to 190° C. while stirring rapidly. The hydrogen pressure initially rises owing to the raising of the temperature but then gradually falls. After 6 hours, the calculated amount of 0.5 mol of hydrogen has been taken up. The autoclave is then cooled and opened, whereupon the ligroin is distilled off from the yellow reaction mixture which has been obtained and the remaining reaction product is introduced in portions into methanol in order to decompose the free sodium metal which is still present. Upon being diluted with water, a small amount (7 g.) of unmodified diphenylene oxide (m. p. 82° C.) is precipitated from the alcoholic solution, the said oxide being filtered off. By acidifying the alkaline filtrate with hydrochloric acid, 2-hydroxydiphenyl is precipitated as a yellow oil, which solidifies slowly and can be filtered with suction.

155 g. of alkali-soluble product are obtained, from which it is possible to obtain by fractionation 125 g. of pure 2-hydroxydiphenyl (B. P. $_{15}$: 152–154° C. M. P. 56°). 30 g. of a phenol mixture boiling at higher temperature remain in the distillation residue.

Example 2

170 g. of diphenyl ether are dissolved in 200 cc. of ligroin and, after adding 46 g. of sodium metal, hydrogenated in the manner described in Example 1 while stirring vigorously. Temperature: 180–186° C. time 12 hours; Hydrogen absorption: 0.3 mol of hydrogen.

After distilling off the ligroin-benzene mixture, the reaction mixture is treated as in Example 1 with methanol and water and the alkaline solution is acidified with hydrochloric acid after being filtered. By extraction with ether and distilling off the latter, 80 g. of phenol mixture are obtained, this being equal to 85% of the theoretical.

55 g. of phenol (B. P. 182–184°) can be obtained from the said phenol mixture by distillation. 24 g. of phenol boiling at a higher temperature remain in the residue.

Example 3

168 g. of diphenylene oxide, 230 cc. of ligroin and 40 g. of potassium metal are reacted in the manner described in Example 1 at 190° C. and while stirring rapidly. 0.33 mol of hydrogen have been absorbed after 18 hours. The mixture is worked up as described in Example 1. In this manner there are obtained 15 g. of alkali-insoluble product, consisting mainly of unmodified diphenylene oxide, and 138 g. of a crude 2-hydroxy-diphenyl product=81.2% of the theoretical.

By distilling the crude product, it is possible to obtain 118 g. of pure 2-hydroxydiphenyl (M. P. 56° C.).

Example 4

125 g. of phenetole are dissolved in 230 cc. of ligroin and hydrogenated at 190° C. after adding 50 g. of sodium metal. Approximately 0.25 mol of hydrogen are taken up in 12 hours.

After distilling off the ligroin, the reaction mixture is decomposed with methanol and water, the alkali-insoluble fractions are distilled off and the phenol which is formed is isolated by acidifying the solution with hydrochloric acid and extracting with ether. Yield: 49 g. of phenol (B. P. 182–184° C.).

Example 5

108 g. of anisole are dissolved in 230 cc. of ligroin and, after adding 50 g. of sodium metal, hydrogenated in the manner described in Example 1 while stirring rapidly and at a temperature of 190° C. The reaction mixture is removed from the autoclave after 12 hours and worked up in the usual manner. 70 g. of phenol mixture are isolated, and 65 g. of pure phenol (B. P. 182–184° C.) can be obtained therefrom by distillation.

Example 6

(a) 168 g. of diphenylene oxide, suspended in 230 cc. of ligroin, and 46 g. of sodium metal, are reacted at a temperature of 190° C. and a hydrogen pressure of 40 atm. in the manner described in Example 1. The reaction is stopped after 3 hours, when the hydrogen pressure has dropped to 30 atm. On being worked up in the usual manner, 39 g. of alkali-soluble products are obtained in addition to the predominant amount of unmodified diphenylene oxide. 27 g. of hydroxydiphenyl (B. P. $_{15}$: 152–154° C.) pass over when the said products are distilled.

(b) If the decomposition is carried out under the same conditions as described in Example 6(a), but with addition of 20 g. of fluorene, the working up results in 85 g. of alkali-soluble product (50.3% of the theoretical) being obtained with a hydrogen consumption of 31 atm. as well as unmodified starting material. 55 g. of pure hydroxydiphenyl (B. P. $_{15}$: 152–154° C.) can be obtained from the said product by distillation.

(c) If the decomposition is carried out under the same conditions as described in Example 6(a), but with addition of 20 g. of Raney nickel all the hydrogen (40 atm.) is consumed. Working up results in 70 g. of alkali-soluble product being obtained, from which 52 g. of pure hydroxydiphenyl are recovered by distillation.

Example 7

168 g. of diphenylene oxide, 46 g. of sodium metal, 20 g. of fluorene and 230 cc. of ligroin are reacted in the manner described in Example 1. Reaction temperature: 150° C.; hydrogen consumption: 40 atm.=0.5 mol.

On working up, there were obtained the following: alkali-insoluble products: 27 g. (containing fluorene), alkali-soluble products: 150 g., from which 95 g. of pure hydroxydiphenyl (B. P. $_{15}$: 150–152° C.) can be obtained.

We claim:
1. A process for the fission of ethers to compounds containing hydroxyl groups and to hydrocarbons which comprises treating an ether containing only one ether configuration on one carbon atom selected from the group consisting of diaromatic, aromatic-aliphatic and cycloaromatic ethers the ring of the cyclic ethers of said group being a five-membered ring, with molecular hydrogen in the presence of an alkali metal at a temperature of about 100–300° C. and recovering the reaction products formed.

2. The process as claimed in claim 1, where the reaction is carried out in the presence of a catalyst.

3. The process as claimed in claim 1, which is carried out in the presence of an inert organic diluent.

4. The process as claimed in claim 1, which is carried out at temperatures of about 150°–200° C.

5. A process for the fission of diphenylene oxide which comprises treating a diphenylene oxide with molecular hydrogen in the presence of an alkali metal and an inert organic diluent at a temperature of about 100–300° C. and recovering the 2-hydroxydiphenyl formed.

References Cited in the file of this patent

FOREIGN PATENTS

| | | |
|---|---|---|
| 492,064 | Germany | Feb. 17, 1930 |
| 545,583 | Germany | Mar. 3, 1932 |